United States Patent

Sprenger

[15] 3,642,571
[45] Feb. 15, 1972

[54] METHOD OF SIZING CELLULOSIC FIBERS USING AN N,N,-(X-ALKYL)-N-CARBAMATE—($N_1'$, $N_1'$-ALKYLEN)UREA

[72] Inventor: Gerhard Ewald Sprenger, Carlstadt, N.J.

[73] Assignee: Sun Chemical Corporation, New York, N.Y.

[22] Filed: Dec. 8, 1969

[21] Appl. No.: 883,276

[52] U.S. Cl. ............................162/158, 8/116.2, 162/183, 260/239 E
[51] Int. Cl. ......................................................D21h 3/02
[58] Field of Search..................162/158; 8/116.2; 260/239 E

[56] References Cited

UNITED STATES PATENTS

| | | | |
|---|---|---|---|
| 2,327,760 | 8/1943 | Bestian et al. | 8/116.2 X |
| 2,422,578 | 6/1967 | Mathes | 260/239 E |
| 3,310,460 | 3/1967 | Goldstein et al. | 162/164 |

Primary Examiner—S. Leon Bashore
Assistant Examiner—Frederick Frei
Attorney—Cynthia Berlow

[57] ABSTRACT

Aqueous sizing compositions are prepared by combining an alkyl-N-substituted carbamate containing an isocyanate group with an alpha, beta-alkylenimine to form an N,N-(X-alkyl)-N-carbamate, ($N_1'$,$N_1'$-alkylen)urea of a divalent organic radical having the formula:

Formula I

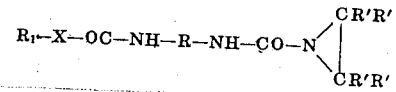

which is in situ or subsequently, with the aid of an emulsifying agent, dispersed in water.

In the formula each $R'$ is hydrogen or methyl or ethyl so that their combined number of carbon atoms totals from zero to not more than two and R is a divalent organic radical, namely an arylene, alkylarylene, arylalkylene, cycloalkylene or alkylene radical, which may or may not contain ethylenic double bonds.

$R_1$ is alkyl, alkenyl, aralkyl, cycloalkyl or cycloalkenyl which may also contain other groups which are inert to isocyanate. The carbon atoms of R and $R_1$ combined should total at least eight and preferably be not more than 54 carbon atoms. X is oxygen or divalent sulfur.

3 Claims, No Drawings

A METHOD OF SIZING CELLULOSIC FIBERS USING AN N,N,-(X-ALKYL)-N-CARBAMATE—(N₁',N₁'-ALKYLEN)UREA

DESCRIPTION OF THE INVENTION

The present invention relates to production and use of novel waterproofing and sizing compounds, particularly useful in applications to paper and paper pulp, derived by the reaction of an alkylcarbamate substituted isocyanate and alpha, beta-alkylenimine to form N,N₁-(alkyl-N-carbamate), (N'₁,N'₁-alkylenurea) complexes, which will chemically react with cellulosic fibers of paper or textiles.

It is a primary object of the present invention to provide novel paper-sizing compounds which will render paper resistant to water as such or to aqueous compositions, such as ink, fruit juices, milk, blood, beverages, and the like.

Another object is to provide a novel paper size which may be used in internal or beater sizing, where the sizing compositions are added to the paper pulp in the beater of the paper making system prior to the forming of the paper-web, in contrast to the external or surface sizing process, where a sizing composition is applied to the surface of an already formed paper.

A further object is to provide a novel paper size which is superior to rosin and does not require an acid pH with addition of alum to precipitate the size on the pulp for physical adherence, which acid sizing results in paper, impaired in its aging properties and also unsuitable for many purposes on account of its undesired stiffness and brittleness and which is for sizing under neutral or alkaline conditions.

A still further object is to prepare a novel paper size which is stable in aqueous environment by being not substantially or highly reactive toward water with low shelf life, and the aqueous compositions of which do not require acid-resistant materials for drums, bulk storage containers and equipment for continuously feeding to the head box of paper-making machines.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

Alkylketene dimers, when used as reactive paper sizes, are not satisfactory. These dimers of the formula

FORMULA II

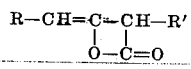

while being reactive to cellulose, are also reactive to water. This is detrimental to their storage life which is limited for aqueous emulsions to one month at a storage temperature 75° F., a temperature requiring refrigerated store rooms during the summer. In an effort to achieve more stability, the alkylketene dimer emulsions are made slightly acidic to minimize loss of efficiency due to hydrolysis; however, this acidic reaction causes metal corrosion and requires the use of acid-resistant materials.

Furthermore, sizing with these dimers requires, for optimal performance, low temperatures and an acid pH during the wet stages of the paper-making process and an alkaline pH and temperatures of about 200° F. for several minutes for curing the size on the dry paper. The low temperature required during the wet stage of the processing, including the drying of the paperweb, results in prolonged drying times, a condition which is not compatible with high speed processing, as demanded by present day manufacturing requirements.

The sizes of the present invention, derived from isocyanate and alkylenimine, are stable products suitable for storage and use under neutral and alkaline conditions and substantially free from the above cited disadvantages of the alkylketene dimer sizes. Using them provides a simple and effective process of sizing paper by their addition to the paper pulp prior to or during the paper forming.

The isocyanate-alkylenimine derived sizes of the present invention are characterized by having a long chain alkyl group attached to the isocyanate reactant. A further characteristic is that this long chain alkyl group is attached to the isocyanate-bearing group in the form of an alkylcarbamate group so that an alkylcarbamate-substituted isocyanate of the formula:

FORMULA III

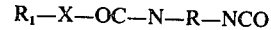

is the general isocyanate to be reacted with an alpha, beta-alkylenimine to form the size compositions of this invention, where R and R₁ and X are the same as in Formula I.

Alkylcarbamate-substituted isocyanates of the Formula III and with the term "alkyl" understood in the broad sense of R₁ are obtainable from diisocyanates and less desirable triisocyanates by partial reaction with alcohols and thioalcohols.

Representative of such isocyanates having an isocyanate functionality of preferably two are phenylenediisocyanates, including the preferred tolylenediisocyanates, naphthalenediisocyanates, methylene-bis(4phenylisocyanate and its substituted derivatives, benzidinediisocyanates and derivatives, triphenylmethanetriisocyanates and derivatives; diisocyanates and triisocyanates in which two benzene rings are joined through an ether, thio-ether, sulfone or carbamide group can also be used. Other useful isocyanates are the aliphatic or cycloaliphatic hexamethylenediisocyanates; cyclohexylenediisocyanates; 2,2,4-trimethylhexanediisocyanate, 3-isocyanatomethyl-3,5,5-trimethylcyclohexylisocyanate; and the so-called "DDI-diisocyanates," as produced by General Mills, Inc., as derivatives of the "Dimer Acids," obtained by Diels-Alder Condensation of linseed oil fatty acid and related unsaturated fatty acids.

While all the polyisocyanates cited and also others, e.g., the polymethylenepolyphenylisocyanates of functionality two to three, are useful for the production of alkylcarbamate-substituted isocyanates, the preferred polyisocyanates are those of isocyanoto functionality of two and of these, the most desirable are the tolylenediisocyanates, of which the 2,4 and the 2,6-isomers, as well as their mixtures are most useful. The specific reactivity of the tolylenediisocyanates make them preferred for use.

Generally, on partial and selective reaction of a diisocyanate with an alcohol or thio-alcohol, to form the corresponding carbamate-substituted monoisocyanate, its yield will be diminished by the unavoidable formation of some biscarbamate; when using equimolecular quantities of diisocyanate and alcohol, the formation of biscarbamate will have as its consequence, that an amount of diisocyanate, equal to the amount of bis-carbamate formed, remains unreacted. Optimal yields of monocarbamate-substituted isocyanate, on reaction of a diisocyanate with a given amount of alcohol will be obtained.

1. the larger the excess of diisocyanate over alcohol employed, and
2. the wider the spread reactivity of the isocyanate groups toward alcohol.

The first expediency, if an essentially pure carbamate-substituted isocyanate is desired, requires its isolation, preferably by recovery of the excess unreacted diisocyanate. The second condition, however, if sufficiently met leads to optimal yield by using equimolecular quantities of diisocyanate and alcohol.

When using tolylenediisocyanate, the condition of difference of reactivity between the two isocyanate groups toward alcohol is decidedly met by the faster reaction rate of the 4-isocyanate group in the 2,4-isomer, and sufficiently met in the 2,6-isomer, where both of them have, initially, identical reactivity, but after reaction of one of them, the one remaining has become deactivated to a diminished reactivity. Hence, both diisocyanates as well as their mixtures are well suited for efficient production of alkylcarbamate substituted isocyanates, without substantial formation of unwanted byproducts.

The hydroxyl and hydrosulfide compounds, to be reacted with the preferred diisocyanates to form the required alkylcarbamate substituted isocyanates will be, as already indicated for $R_1$, of varied kinds. Also the hydroxyl and hydrosulfide groups, attached to $R_1$, will be primary, secondary or tertiary and include those in phenols. Furthermore $R_1$ may contain other than just hydrocarbon groups as there will be oxygen or divalent sulfur in ethers, carbonyl compounds and esters.

The preferred alpha, beta-alkylenimines to be reacted with the alkylcarbamate substituted toluylisocyanate, to produce the desired sizing compositions of this invention are ethylenimine and its C-substituted homologues. The number of carbon atoms contained in the alkylenimines may be limited to four. This would include ethylenimine, its monomethyl, ethyl and dimethyl derivatives, propylenimine 1,2 and 2.3-butylenimines and 1.1-dimethylethylenimine, all of which contain one hydrogen bound to nitrogen. The preferred imines are ethylenimine and propylenimine.

The purpose and the necessity for the presence of the imine group in the sizing compositions is to provide a group which is capable of reaction with the cellulose of paper or textile fibers and without appreciable reaction with water, for permanent attachment of the hydrophobic principle, in the form of the long chain alkyl group, incorporated in the sizing composition by way of carbamate substitution.

The reaction of the tolylenediisocyanates leading to the carbamate substituted isocyanates and, finally, to the production of the sizing agents proper, may be carried out as follows:

For the first reaction, a tolylenediisocyanate or a mixture of its isomers, is reacted with a hydroxyl or hydrosulfide compound, containing a long chain group, in the presence of an organic solvent, preferably of a low boiling point and inert to isocyanate.

The subsequent reaction of the resulting isocyanate will take place in the solution of the first reaction, by adding it to the imine or vice versa, and the sizing agent formed may be isolated by either crystallization and filtration or boiling off the solvent, if necessary in vacuo.

Inasmuch as the most advantageous application of the sizing agents will be from aqueous emulsion, it has been found advantageous also in the preparation of emulsions to effect the latter reaction of the isocyanate with imine likewise in an aqueous medium, containing an emulsifying system. A suitable emulsifying system may contain non-ionic surface-active agents of the ethylenoxide condensate type. Of these, the sorbitan-monofatty-acid ester-polyethylenoxide condensates, known under the trade names "Tween" and "Span" and sold by Atlas Chemical Industries, are suitable.

Suitable emulsions of the paper-sizing compounds may also be obtained by incorporating emulsifying agents, substantially free from hydroxyl groups and inert to isocyanate with the substituted isocyanate, after isolating it from the solvent, used in its preparation and prior to its reaction with the imine in the aqueous phase. Suitable emulsifying agents of the ethylenoxide condensate type, free from hydroxyl groups, are described by Cyrus A. Weissgerber in U.S. Pat. No. 2,856,310.

In paper sizing with the compounds of this invention, their performance is much enhanced when used in combination with a retention aid. Retention aids effect deposition of additives on the fibers of paper pulp with more or less complete exhaustion of the effluent. Preferred retention aids are polyethylenimines and other polyalkylenimines.

Other retention aids are the polyamide-epichlorohydrin resins, known under the trade name "Kymene 557" and sold by Hercules, Inc., and the so-called cationic starches, such as "Cato-8" of the National Starch and Chemical Corporation and "Epic-N" of A. M. Meincke & Son, Inc.

The amount of retention aid used in relation to sizing agent is dependent on its performance and cost. In general, the amount used may vary from 10 to 85 percent by weight of the sizing agent and the cost of it will in most cases not exceed that of the sizing agent used. The retention aid may be added to the head box of the paper making equipment separately from the sizing agent emulsion, or it may be incorporated in it, especially where its presence adds to the stability of such emulsions. In general and when applicable, it is preferred to add the size first and then the retention aid.

The preparation of the alkylcarbamate substituted isocyanate-intermediates and of the sizing agents themselves, as well as of their emulsions and of their use in the sizing of paper is set forth in the examples.

EXAMPLE I

To a solution of 174 g. of tolylene-2,4-diisocyanate and 1.5 g. dibutyltindiacetate in 500 g. hexane, there are added, while stirring and cooling, 508 g. of symmetrical dihexadecylisopropanol, which is obtainable by the selective hydrogenation of stearone. During the addition of the alcohol, the reaction temperature is maintained at 35° C. After the completion of the alcohol addition, stirring is discontinued after the evolution of heat has substantially subsided and the reaction mass is allowed to remain in the reaction vessel over night, surrounded by a water bath at ambient temperature.

On the following morning the hexane solvent is removed from the solution by distillation in vacuo, first at a pressure of 125 Torr. and later at 15 Torr. at a temperature not exceeding 100° C.

The residual liquid, which contains only traces of unreacted diisocyanate, and therefore, of formed bis-carbamate, is essentially pure symmetrical O-dihexadecylisopropyl-4,N-2-isocyanatotoluylcarbamate.

To the liquid, amounting to 685 g., 55 g. of "Tween 80" are gradually and proportionally added while it is streamed into a well-stirred solution of 43 g. of ethylenimine in 1,590 g. of water at 40° C. The resulting crude emulsion is then passed twice through a homogenizer at 35° to 40° C.

The obtained thin emulsion is adjusted to a pH 8 to 8.5 by the addition of ammonia. The emulsion is stable on storage and after standing for 6 months at a temperature ranging between 55° and 90° F., was found without cream and as effective for paper sizing as a freshly prepared emulsion. Its active ingredient is 2,$N_1$-tolylene-($N'_1$,$N'_1$-ethylene)urea, (O-symmetrical dihexadecylisopropyl)-4,N-carbamate.

EXAMPLE II

To a solution of the commercial mixture of tolylene-2,4 and 2,6-diisocyanates in the mole ratio of 80:20 percent, and 1 g. of dibutyltindiacetate in 600 g. of ethylenedichloride, there were, as in Example I, added 315 g. of commercial henylalcohol.

After the removal of the ethylenechloride solvent, after the completion of the reaction, a residual liquid of the amount of 494 g., essentially of O-behenyl-4,N and -6,N-2-isocyanatotoluylcarbamates are obtained.

The liquid is, as in Example I, reacted with 57 g. of propylenimine to a 30 percent aqueous emulsion, containing as the active ingredient a mixture of 2,$N_1$-tolylene-($N'_1$,$N'_1$-propylene) urea, (O-behenyl)-4, N and -6,N-carbamates.

EXAMPLE III

Example II is repeated, using 270 g., of oleylalcohol instead of behenylalcohol. The emulsion obtained contains as the active ingredient the mixture of the isomeric $N_1$-tolylene-($N'_1$,$N'_1$-propylene)urea, (O-oleyl)-N-carbamates.

EXAMPLE IV

Abietyl alcohol, a hydroxyl compound, is reacted with tolylene diisocyanate. "Abitol," an abietyl alcohol sold by Hercules, Inc., derived from rosin by hydrogenation and having the hydroxyl equivalent weight of 340 g. may be used.

To 174 g. of tolylene-2,4-diisocyanate and 1.5 g. of dibutyltindiacetate, dissolved in 450 g. benzene, there are gradually added, while stirring and maintaining a temperature of 30°–35° C., 340 g. of "Abitol." After the completion of the reaction and the removal of the solvent, effected as in the previous examples, 518 g. of tan colored liquid, consisting mainly of O-abietyl-4,N-2-isocyanatotoluylcarbamate were obtained.

This liquid is reacted with an aqueous solution of 43 g. of ethylenimine, in a manner as described in Example I to yield an emulsion, containing as the active ingredient 2,$N_1$-tolylene-($N'_1$,$N'_1$-ethylene)urea,(O-abietyl)-4,N-carbamate.

EXAMPLE V

The hydroxyl compound, to be reacted with tolylene-diisocyanate in this example is commercial dinoylphenol, obtained by condensation of tripropylene with phenol. Its hydroxyl equivalent was determined as 351 g.

174 g. of tolylene-2,4-diisocyanate and 2.0 g. of dibutyltindiacetate, dissolved in 350 g. of hexane were, as in Example IV reacted with 351 g. of dinonylphenol. After completion of the reaction, i.e., after 17 hours at 30°–35° C., 876 g. of a hexane solution, containing O-dinonylphenyl-4,N2-isocyanatotoluylcarbamate are obtained.

To this solution, there were added, while maintaining a temperature of 35°–40° C., first 5 g. on N-methylmorpholine and then 43 g. of ethylenimine. One hour after completion of the imine addition, the hexane solvent was removed by distillation in vacuo, first at a pressure of 125 Torr. and finally at a pressure of 15 Torr. and at a temperature not exceeding 100° C. 680 g. of an amber liquid, congealing at 60°–70° C. were obtained, which is mainly 2,$N_1$-tolylene-($N'_1$,$N'_1$-ethylene)urea-(O-dinonylphenyl)-urea-(O-dinonylphenyl)-4,N-carbamate. Contrary to the materials of Example I, II, and III, the compound of this example is miscible with methanol, ethanol, isopropanol and higher alcohols.

EXAMPLE VI

Dinonylthiophenol is obtained from thiophenol similarly as the corresponding compound is to be reacted with diisocyanate.

One hydrosulfide equivalent of dinonylthiophenol, amounting to 372 g. is processed strictly analogously to the dinonylphenol as in Example V.

The material finally obtained after reaction with ethylenimine is 2,$N_1$-tolylene-($N'_1$,1,$N'_1$-ehtylene)urea-(S-dinonylphenyl)-4,N-carbamate. Its physical properties are very similar to those of the dinonylphenol compound of the previous example.

EXAMPLE VII

The hydroxyl compound employed in this example is dinonylphenylthioethanol, derived from dinonylthiophenol by reaction with ethylenoxide, using a slight excess of ethylenoxide over stoichiometric amounts.

One hydroxyl equivalent of the cited compound, amounting to 428 g., is processed analogously to that of Example V. The material finally obtained after reaction with ethylenimine is 2,$N_1$-tolylene-($N'_1$,$N'_1$-ethylene)urea-(O-dinonylphenylthioethyl)-4,N-carbamate. Its physical properties are similar to those of the compounds obtained in Examples V and VI, except that it has a lower melting point.

Similarly as the dinonylphenylthioethanol, octyl, dioctyl, nonyl, dinonyl or mixed alkylphenoxyethanols and alkylphenylthioethanols, which are commercially available, may be successively reacted with diisocyanate and imine, to yield useful compounds of the invention.

EXAMPLE VIII

Glyceroldistearate, of the hydroxyl Number 90 and corresponding to the equivalent weight of 620 g. is reacted with tolylenediisocyanate.

620 g. of the glyceroldistearate are similarly processed as the dihexadecylispropanol in Example I, to yield an aqueous emulsion of the compound 2,$N_1$-tolylene-($N'_1$,$N'_1$-ethylene)urea-(O-glyceryldistearate)-4,N-carbamate.

EXAMPLE IX

Tolylenediisocyanate is reacted with the hydroxyl compound dihexadecylmalate of the formula $$H_2C-CO-O-C_{16}H_{33}$$
$$HO-HC-CO-O-C_{16}H_{33}$$

This compound is obtained by the esterification of malic acid (commercial "Pomalic Acid" of Allied Chemical Corporation) with hexadecylalcohol (cetyl or palmitylalcohol). The ester material, as prepared, had the hydroxyl number 99.5 and an acid number of 2.4 corresponding to the empirical molecular weight of 564 g.

564 g. of this ester are added to a solution of 174 g. of tolylene-2,4-diisocyanate and 1.5 g. dibutyltindiacetate in 500 g. benzene at 30°–35° C. and processed in the same way as in Example I After the removal of the benzene solvent a liquid is obtained, which is substantially material of the formula, which is O-dihexadecylamlate-4,N-2-isocyanatotoluylcarbamate.

$$OCN-C_6H_3(CH_3)-NH-CO-O-CH-CO-O-C_{16}H_{33}$$
$$CH_2CO-O-C_{16}H_{33}$$

This liquid is reacted with aqueous ethylenimine in a way as described in Example I. The emulsion which is obtained contains as the active material the compound of the formula $$\begin{array}{c} H_2C \\ | \\ H_2C \end{array}\!\!\!\!\!\!\!\!\!\!\!\!\!N-CO-NH-C_6H_3(CH_3)-NH-CO-O-CH-CO-O-C_{16}H_{33}$$
$$CH_2CO-O-C_{16}H_{33}$$

EXAMPLE X

In this example "DDI-diisocyanate-1410"(General Mills, Inc.), a liquid a aliphatic (36 carbon atoms) diisocyanate of the formula $$OCN-CH_2(CH_2)_7\!\!\!-\!\!\!\!\underset{\underset{(CH_2)_5CH_3}{(CH_2)_5CH_3}}{\bigcirc}\!\!\!-\!\!CH=CH(CH_2)_7CH_2-NCO$$

is employed.

To a solution of 600 g. "DDI-diisocyanate 1410" and 5 g. N-methylmorpholine in 400 g. benzene, there are added, while stirring and cooling, 46 g. of ethanol so as to maintain a temperature of 30°–35° C. The reaction is substantially completed after 15 hours, after which the solution is reacted with ethylenimine, 43 g. of which are gradually added at 35°–40 C. After removal of the benzene solvent by vacuum distillation, a viscous oil containing the desired product $N_1$-DDI-($N'_1$,$N'_1$-ethylene)urea-(O-ethyl)-N-carbamate is obtained.

In the production of alkylcarbamate substituted isocyanates from diisocyanates by reaction with hydroxy compounds, in the above examples, it is advantageous to use a catalyst for activation, so that the reaction may be carried out at a low temperature, where the difference of the reactivity between the two diisocyanate groups is more widespread than at a more elevated temperature. Catalysts to activate hydroxyl and hydrosulfide groups for reaction with isocyanate are tertiary amines, and most active is dibutyltindiacetate, which is also preferred, because it is odorless. Tertiary amines of low odor potential such as N-methylmorpholine are used where their alkalinity is of advantage. This occurs where ethylenimine or an other imine is added to the isocyanate rather than vice versa, in the final reaction to produce the end product, namely the paper-sizing compound.

All of the alkylcarbamate substituted isocyanates produced in the examples are liquid at room temperature. Most of their reaction products with ethylenimine or propylenimine are solid and melt at elevated temperatures. It is desirable to produce emulsions from these compounds in liquid form. Aqueous emulsions of those sizes that are solid at room temperature with the melting point close to the boiling point of water are advantageously prepared from the liquid monoisocyanate by reaction with aqueous imine in the presence of emulsifying agents.

The hydroxyl or hydrosulfide compounds which contain no groups other than hydrocarbon, as defined for $R_1$ in Formula I may be primary, secondary or tertiary, such as —$CH_2$—XH, = CH—XH, and ≡ C—XH, where X is oxygen or divalent sulfur.

Behenol, oleylalcohol, and abietylalcohol are examples of compounds with a primary —$CH_2$—XH group while the symmetrical dihexadecylisopropanol employed in Example I contains a secondary = CH—XH group. Terpineol, $C_{10}H_{17}$—OH is, an example of a tertiary alcohol—$C(CH_3)_2OH$.

Suitable hydroxyl and hydrosulfide compounds are aliphatic alcohols, such as the straight open chain alkyl or alkenyl fatty alcohols derived from fatty acids or occurring naturally in whale oil. Other aliphatic alcohols, which are not necessarily straight chain, are the oxo-alcohols, derived from diverse olefinic hydrocarbons. Still other are synthetic alcohol, which may be straight chain, or not, primary and secondary alcohols, derived by hydrogenation of condensation products of aldehydes and or ketones. Still others are secondary alcohols derived by hydrogenation of ketones, obtainable by condensation of fatty acids, of which the dihexadecylisopropanol, employed in Example I is typical. Suitable thioalcohols are available from the alcohols by reaction with sulfur compounds, such as thiourea.

Terpineols and alcohols derived from the hydrogenation of abietic acid are representatives of cycloalkyl and cycloalkenyl hydroxyl compounds, which may be used.

Suitable hydroxyl and hydrosulfide compound for the invention are the alkylphenols and thiophenols as employed in Examples V and VI. Suitable hydroxyl and hydrosulfide compounds may be augmented by compounds which, besides hydrocarbon contain other groups such as carbalkoxy, alkoxy, aryloxy, aralkoxy, or halogen attached to aromatic carbon and ketonic carbonyl. Hydroxyl compounds that are suitable are the mono and diglycolesters of fatty acids and of abietic acid, the mono and diglycol ethers of the above cited hydroxyl and hydrosulfide compounds and especially those of alkylphenols and thiophenols. The diesters of glycerol with fatty acids and abietic acid as well as the diethers of glycerol with the above cited hydroxyl and hydrosulfide compounds may be used. Also the esters of hydroxymono, di and tricarboxylic acids with the above cited alcohols, such as for example the esters of stearyl alcohol with hydroxyacetic acid and lactic acid or of hexadecylalcohol with malic acid or of the trialkylesters of octyl, nonyl and decylalcohols with citric acid to the corresponding tertiary hydroxyl containing esters.

The following example describes the utilization of the new compositions, namely the reaction products of ethylenimines, which may be substituted, with alkylcarbamate substituted isocyanatotoluenes (generally alkylcarbamate substituted isocyanates), as paper sizes in the manufacture of paper products.

EXAMPLE XI

An aqueous pulp of unbleached Kraft paper stock is prepared at 0.28 percent consistency and 450 Canadian Standard Freeness, in the proportioner of a Noble & Wood experimental paper making assembly, and adjusted to a pH of 8 to 8.5. With slight agitation of the pulp, a small amount of size, based on the weight of dry paper stock in the proportioner, is added within 30 seconds in the form of aqueous emulsion or solution in dioxane or isopropanol, followed by the addition of an equal amount of a 1 percent aqueous solution or dispersion of a retention aid, such as "Epic N."

Two minutes after the addition of the retention aid, one-half of the contents of the proportioner are transferred to the Deckle Box, where a paper sheet of the basis weight of 52 pounds (24 inches×36 inches; 500) is formed. The balance of the contents of the proportioner is likewise made into a duplicate sheet.

The sheets were, immediately after forming, pressed and then dried for 3 minutes on a heated rotating drum at 200° F. and conditioned for at least 48 hours at 25° C. and 50 percent relative humidity. They were then tested for sizing by the water absorption method, according to TAPPI Standard Method T-492, by determining the time after which a drop of dilute lactic acid solution disappears by being soaked up by the paper.

The results of the tests are summarized in the table on the following page.

TABLE.—SIZE—PERFORMANCE

| Size (retention aid) | Water drop absorption times (seconds) TAPPI-T-492 | | |
|---|---|---|---|
| | Concentration | | |
| | 0.01 | 0.05 | 0.10 |
| 1. None | 18 (18) | 18 (18) | 18 (18) |
| 2. Example I | 31 (506) | 3,060 (5,400) | 5,400 (5,400) |
| 3. Example II | 18 (250) | 216 (3,010) | 5,400 (5,400) |
| 4. Example III | 18 (18) | 36 (109) | 3,010 (5,060) |
| 5. Example IV | 21 (631) | 2,090 (4,820) | 5,400 (5,400) |
| 6. Example V | 26 (613) | 409 (2,160) | 5,400 (5,400) |
| 7. Example VI | 31 (543) | 516 (1,810) | 5,400 (5,400) |
| 8. Example VII | 18 (43) | 419 (2,010) | 5,400 (5,400) |
| 9. Example VIII | 21 (341) | 2,160 (5,400) | 5,400 (5,400) |
| 10. Example IX | 25 (493) | 3,840 (5,400) | 5,400 (5,400) |
| 11. Example X | 28 (416) | 2,066 (5,400) | 5,400 (5,400) |
| 12. Example I aged for 6 months | 23 (498) | 5,400 (5,400) | 5,400 (5,400) |

In the table, the concentrations indicated are given in percentage of weight of the size, based on the weight of dry paper stock. The figures without brackets are the absorption times obtained without using retention aid, while the bracketed figures were obtained in the presence of an equal amount of retention aid, namely "Epic N." The sizes are effective in different degrees below the concentration of 0.10 percent, but all size at 0.10 percent. The retention aid proves itself necessary to bring out the full value of the size.

What is claimed is:

1. A method of sizing cellulosic fibers in textile and paper webs which comprises treating them with about 0.01 to 0.1 percent, based on the weight of the dry stock, of an aqueous dispersion of an $N,N_1$-(X-alkyl)-N-carbamate-($N'_1,N'_1$-alkylen)urea of a divalent organic radical having the formula

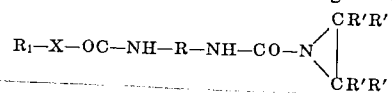

wherein R′ is hydrogen, methyl, or ethyl and the total number of carbon atoms is zero, one, or two; R is an arylene, alkylarylene, arylalkylene, cycloalkylene, or alkylene radical which may contain ethylenic double bonds; $R_1$ is an alkyl, alkenyl, aralkyl, cycloalkyl, or cycloalkenyl radical; X is oxygen or sulfur; and the total number of carbon atoms of R and $R_1$ is eight to 52.

2. The process of claim 1 wherein the sizing compound is the product of the reaction of an alkyl-N-substituted carbamate containing an isocyanate group and an alpha, beta-alkylenimine.

3. The process of claim 1 wherein the sizing dispersion also contains a retention aid in an amount ranging from about 10 to 100 percent by weight, based on the sizing compound.

* * * * *